(12) United States Patent
Cummins et al.

(10) Patent No.: US 9,348,761 B1
(45) Date of Patent: May 24, 2016

(54) WEIGHTED-VALUE CONSISTENT HASHING FOR BALANCING DEVICE WEAR

(71) Applicant: EMC Corporation, Hopkinton, MA (US)

(72) Inventors: Daniel E. Cummins, Hudson, NH (US); Thomas E. Linnell, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 38 days.

(21) Appl. No.: 14/319,084

(22) Filed: Jun. 30, 2014

(51) Int. Cl.
*G06F 12/02* (2006.01)
*G06F 12/10* (2016.01)

(52) U.S. Cl.
CPC ........ *G06F 12/1018* (2013.01); *G06F 12/0246* (2013.01); *G06F 2212/7201* (2013.01)

(58) Field of Classification Search
CPC .......................... G06F 9/505; Y10S 707/99935
See application file for complete search history.

(56) References Cited

PUBLICATIONS

David Karger, et al., "Web Caching with Consistent Hashing," MIT Laboratory for Computer Science, vol. 31 Issue 11-16, May 17, 1999, pp. 1203-1213.
David Karger, et al., "Consistent Hashing and Random Trees: Distributed Caching Protocols for Relieving Hot Spots on the World Wide Web," In Proceedings of the Twenty-Ninth Annual ACM Symposium on Theory of Computing, pp. 654-663, 1997.

*Primary Examiner* — Yong Choe
(74) *Attorney, Agent, or Firm* — Muirhead and Saturnelli, LLC

(57) ABSTRACT

Described are techniques that select a physical storage device for storing data. Device weights for physical storage devices are determined in accordance with factor(s) including a storage capacity each physical storage device and an amount of remaining write capacity of each physical storage device representing an amount of remaining writes for an expected lifetime of each physical storage device. A replica set is determined for each physical storage device in accordance with a device weight. Hash value sets are determined for the physical storage devices using a hash function. A first hash value for a first data item is determined using the hash function. The first hash value is mapped to a second hash value included in one of hash value sets associated with a corresponding one of the physical storage devices. The corresponding one of the physical storage devices is selected to store the first data item.

20 Claims, 8 Drawing Sheets

WEIGHTED-VALUE CONSISTENT HASHING FOR BALANCING DEVICE WEAR

BACKGROUND

1. Technical Field

This application relates to techniques used in connection with storage devices.

2. Description of Related Art

Systems may include different resources used by one or more host processors. Resources and host processors in a system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, storage devices such as disk drives and solid state drives, and disk interface units. The host systems access the storage devices through a plurality of channels provided therewith. Host systems provide data and access control information through the channels to the storage device and the storage device provides data to the host systems also through the channels. The host systems do not address the physical storage device directly, but rather, access what appears to the host systems as a plurality of logical disk units, or more generally logical storage units. The logical storage units may or may not correspond to the actual physical storage drives. Allowing multiple host systems to access a single storage system allows the host systems to share data stored on storage devices of the storage system. In order to facilitate sharing of the data on the storage devices, additional software on the data storage systems may also be used.

SUMMARY OF THE INVENTION

In accordance with one aspect of the invention is a method of selecting a physical storage device for storing data comprising: determining a plurality of device weights for a plurality of physical storage devices, wherein a different one of the plurality of device weights is determined for each of the plurality of physical storage devices in accordance with one or more factors including any of a storage capacity of said each physical storage device and an amount of remaining write capacity of said each physical storage device representing an amount of remaining writes for an expected lifetime of said each physical storage device; determining a replica set for each of said plurality of physical storage devices, said replica set for said each physical storage device including a number of replicas in accordance with the different one of the plurality of device weights for said each physical storage device; determining a plurality of hash value sets for said plurality of physical storage devices, wherein an associated one of the plurality of hash value sets is determined for each of said plurality of physical storage devices, said associated one of the plurality of hash values sets for said each physical storage device including hash values determined using a hash function and said replica set of said each physical storage device, wherein each of said hash values is generated as an output of the hash function when using a corresponding one of the replicas of the replica set for said each physical storage device as an input to the hash function; determining a first hash value for a first data item using the hash function; mapping the first hash value to a second hash value included in a first of the plurality of hash value sets associated with a corresponding one of the plurality of physical storage devices; and selecting the corresponding one of the plurality of physical storage devices to store the first data item. The method may include storing the first data item on the corresponding one of the plurality of physical storage devices. The hashing function may generate a hash value included in a predetermined range of hash values, said predetermined range of hash values forming a continuum of hash values wherein a smallest hash value in the predetermined range subsequently follows a largest hash value in the predetermined range. The mapping may be performed using any of a first rule that maps the first hash value to a nearest subsequent hash value in the continuum that is included in one of the plurality of hash value sets for one of the plurality of physical storage devices and a second rule that maps the first hash value to a nearest previous hash value in the continuum that is included in one of the plurality of hash value sets for one of the plurality of physical storage devices. A first of the plurality of physical storage devices may have a first of the plurality of device weights and a second of the plurality of physical storage devices may have a second of the plurality of device weights, said first weight being larger than the second weight whereby the first physical storage device is statistically selected by said mapping for storing a data item more frequently than the second physical storage device. The method may include periodically adjusting said plurality of weights based on remaining write capacities of said plurality of physical storage devices at an end of a time period. The plurality of physical storage devices may include a first number of physical storage devices at a first point in time and wherein, at a second point in time subsequent to the first point in time, an additional physical storage device may be added to a system including the first number of physical storage devices. The method may include determining an additional weight for the additional physical storage device in accordance with a storage capacity and an amount of remaining write capacity of said additional physical storage device representing an amount of remaining writes for an expected lifetime of said additional physical storage device; determining an additional replica set for said additional physical storage device, said additional replica set including a number of replicas in accordance with the additional weight for said additional physical storage device; and determining an additional hash value set of hash values using the hash function and said additional replica set, wherein each of said hash values in the additional hash set is generated as an output of the hash function when using a corresponding one of the replicas of the additional replica set for said additional physical storage device as an input to the hash function. First processing may be performed subsequent to determining the additional hash value set and subsequent to adding the additional physical storage device to the system. The first processing may include determining a third hash value for a second data item using the hash function; mapping the third hash value to a fourth hash value included in a second corresponding hash value set for a second corresponding one of the plurality of physical storage devices, wherein said second corresponding hash value set is either the additional hash value set of the additional physical storage device or one of the plurality of hash value sets associated with one of the first number of physical devices of the plurality of physical storage devices; and selecting the second corresponding one of the plurality of physical storage devices to store the first data item. The method may include storing the second data on the second corresponding one of the plurality of physical storage devices. The first plurality of physical storage devices may include at least three physical storage devices, wherein the plurality of hash values sets may be determined at a first point in time and the predetermined range of hash values may be partitioned at the first point in time among the plurality of physical storage devices in accordance with the plurality of hash value sets. The method may include performing first processing at a second point in time subsequent to the first point in time, and said first processing may include removing, at the second point in time, a first of the plurality of physical storage devices; responsive to removing the first physical storage device, removing one of the plurality of hash value sets for the first physical storage device; responsive to removing the one hash value set for the first physical storage device, repartitioning the predetermined range of hash values among remaining ones of the plurality of physical storage devices other than said first physical storage device in accordance with remaining ones of the plurality of hash value sets other than said one hash value set for the first physical storage device. A data cache may include the plurality of physical devices and wherein the method may be performed to select the corresponding one of the plurality of physical storage devices for caching the first data item. At a first point in time, a write operation may be received to write the first data item to a first logical address of a virtually provisioned device and no storage may be mapped to the first logical address at the first point in time, and wherein the method may be performed responsive to receiving the write operation that writes the first data item to the first logical address, where the method is performed to allocate storage from said corresponding one of the plurality of physical storage devices to store the first data item. The plurality of physical storage devices may be included in a storage tier of a multi-tiered data storage system and the method may be performed responsive to a decision to move the first data to the storage tier. The plurality of physical storage devices may include any of one or more flash memory-based storage devices and one or more phase change memory devices. Each of said plurality of physical storage devices may have an expected lifetime as a function of a number of writes that may be performed to said each physical storage device.

In accordance with another aspect of the invention is a data storage system comprising: one or more processors; a plurality of physical storage devices; a memory comprising code stored therein that, when executed, performs a method comprising: determining a plurality of device weights for the plurality of physical storage devices, wherein a different one of the plurality of device weights is determined for each of the plurality of physical storage devices in accordance with one or more factors including any of a storage capacity of said each physical storage device and an amount of remaining write capacity of said each physical storage device representing an amount of remaining writes for an expected lifetime of said each physical storage device; determining a replica set for each of said plurality of physical storage devices, said replica set for said each physical storage device including a number of replicas in accordance with the different one of the plurality of device weights for said each physical storage device; determining a plurality of hash value sets for said plurality of physical storage devices, wherein an associated one of the plurality of hash value sets is determined for each of said plurality of physical storage devices, said associated one of the plurality of hash values sets for said each physical storage device including hash values determined using a hash function and said replica set of said each physical storage device, wherein each of said hash values is generated as an output of the hash function when using a corresponding one of the replicas of the replica set for said each physical storage device as an input to the hash function; determining a first hash value for a first data item using the hash function; mapping the first hash value to a second hash value included in a first of the plurality of hash value sets associated with a corresponding one of the plurality of physical storage devices; and selecting the corresponding one of the plurality of physical storage devices to store the first data item.

In accordance with another aspect of the invention is a non-transitory computer readable medium comprising code stored thereon that, when executed by a processor, performs a method that selects a physical storage device for storing data, the method comprising: determining a plurality of device weights for a plurality of physical storage devices, wherein a different one of the plurality of device weights is determined for each of the plurality of physical storage devices in accordance with one or more factors including any of a storage capacity of said each physical storage device and an amount of remaining write capacity of said each physical storage device representing an amount of remaining writes for an expected lifetime of said each physical storage device; determining a replica set for each of said plurality of physical storage devices, said replica set for said each physical storage device including a number of replicas in accordance with the different one of the plurality of device weights for said each physical storage device; determining a plurality of hash value sets for said plurality of physical storage devices, wherein an associated one of the plurality of hash value sets is determined for each of said plurality of physical storage devices, said associated one of the plurality of hash values sets for said each physical storage device including hash values determined using a hash function and said replica set of said each physical storage device, wherein each of said hash values is generated as an output of the hash function when using a corresponding one of the replicas of the replica set for said each physical storage device as an input to the hash function; determining a first hash value for a first data item using the hash function; mapping the first hash value to a second hash value included in a first of the plurality of hash value sets associated with a corresponding one of the plurality of physical storage devices; and selecting the corresponding one of the plurality of physical storage devices to store the first data item. The one or more factors may include any of a flash type or technology, I/O throughput capability, and data throughput capability. The plurality of physical storage devices may include any of one or more flash memory-based storage devices and one or more phase change memory devices. A data cache may include the plurality of physical devices and wherein the method is performed to select the corresponding one of the plurality of physical storage devices for caching the first data item.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
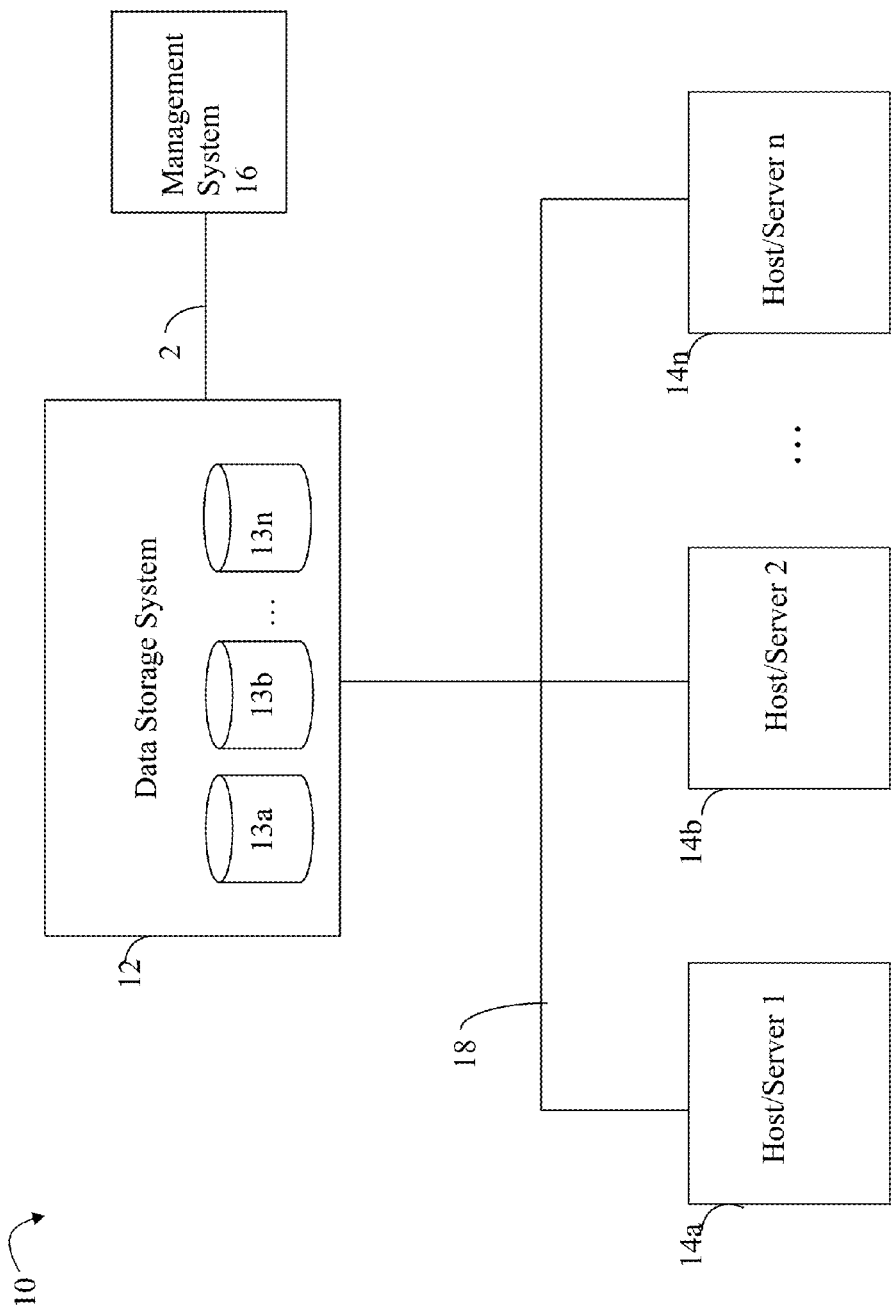
FIGS. 1 and 2 are examples of embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12. In an embodiment having multiple data storage systems, a first data storage system may also issue reads and/or writes to a second data storage system.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives or more generally, physical storage devices of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. An LV or LUN may be used to refer to the foregoing logically defined devices or volumes.

Figure 2:
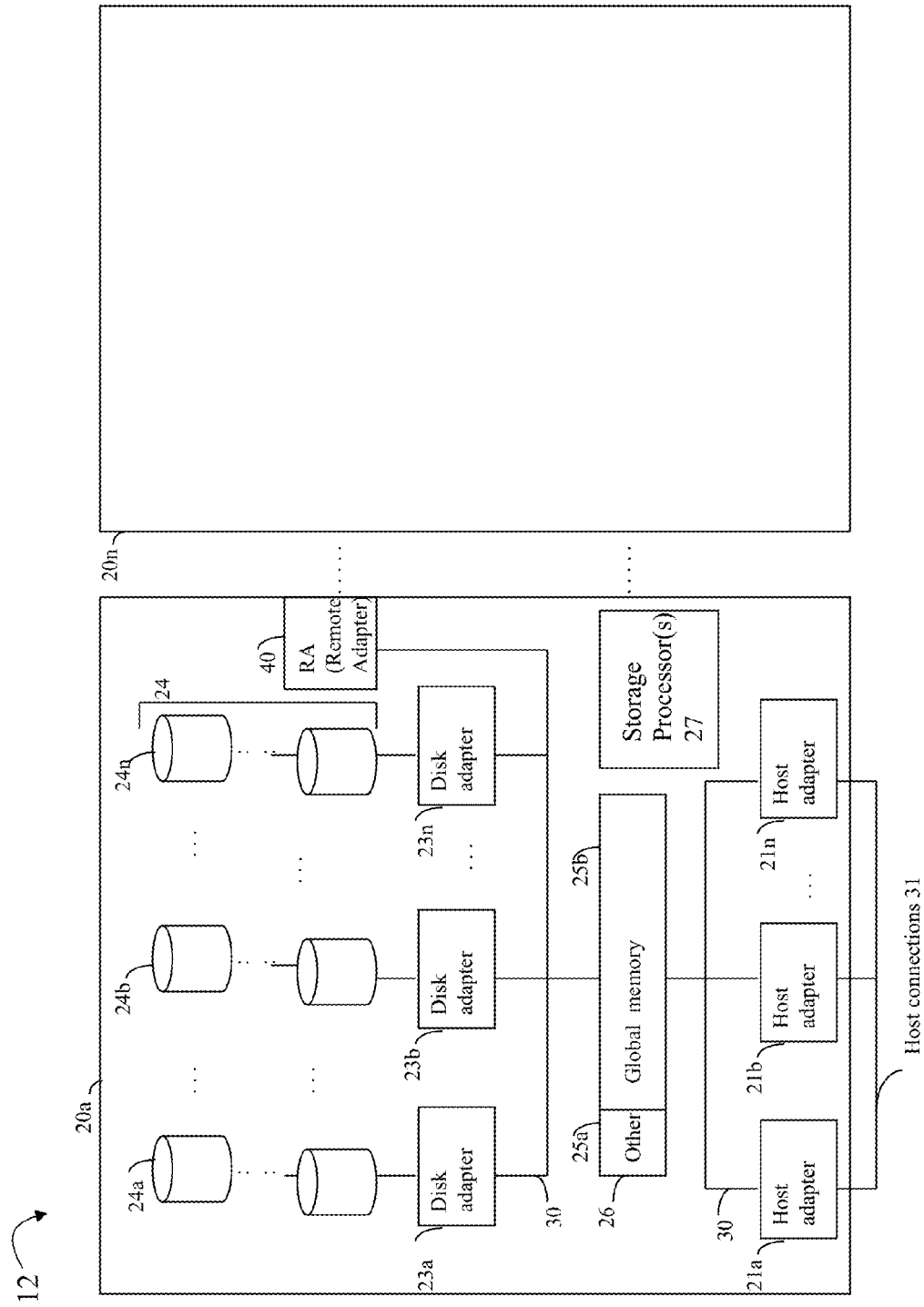

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

It should be noted that, more generally, the physical storage devices 24a-24n may be any suitable type of physical storage device or media. For example, physical devices included in an embodiment of a data storage system may include one or more types of rotating disk drives (e.g., SATA, SAS, FC 15K RPM, FC 10K RPM), one or more types of flash-based storage (e.g., SLC (single level cell) flash, MLC (multi-level cell) flash, TLC, (tri-level cell) flash) or more generally solid state drives (SSDs), and the like.

The system 20a may also include one or more storage processors 27. Each of the storage processors 27 may be CPU and an embodiment may include any number of such processors. For example, VNX™ data storage systems, such as the VNX8000™ data storage system, by EMC Corporation includes two storage processors (SPs). The system 20a may also include one or more host adapters ("HAs") or directors 21a-21n. Each of the HAs may be used to manage communications and data operations between one or more host systems and the global memory. In an embodiment, the HA may be a Fibre Channel Adapter or other front end adapter (FA) which facilitates host communication. The HA communicates with a component of the host such as a host bus adapter (HBA). Generally, directors may also be characterized as the different adapters, such as HAs (including FAs), DAs RAs, and the like, as described herein. RAs (remote adapters) are described in more detail below. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be noted that FIG. 2 generally illustrates components of the data storage system including multiple SPs 27, global memory such as 25b (also referred to herein as main memory accessible to the different adapters and other components of the data storage system), and the like. In an embodiment in accordance with techniques herein, the global or main memory 25b of FIG. 2 may be a logical representation of such memory having any suitable physical implementation. In some embodiments, at least some of the global or main memory 25b may be used as a data cache accessible to the different adapters and components of the data storage system.

The particular data storage system as described in this embodiment, or a particular data storage device thereof, such as a mechanical rotating disk or SSD storage device, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

It should be noted that the data storage system may include multiple SPs in order to provide for redundancy whereby one of the SPs may be active or primary. In the event the active or primary SP fails or otherwise experiences a degradation thereby entering an unhealthy functional state, the other remaining SP may take over and function as the primary SP. In such a system, various suitable processing may be performed to ensure that each of the SPs has sufficient data and state information to assume the role of active or primary SP.

Main memory or global memory (e.g., comprised of memory modules as noted above and elsewhere herein which may also be referred to as global memory) of a system may be used, in whole or in part, as a data cache. For example, such memory may be used as a data cache in connection with storing data of read and write operations. It should be generally noted that reference may be made herein to a cache, cache hit, cache miss, and the like. In such instances in following paragraphs describing exemplary uses and embodiment of techniques herein, reference to cache generally means data cache of the main or global memory accessible generally to the various adapters and components of the data storage system. For a read operation, a read request may result in either a cache hit (e.g., read hit) or a cache miss (read miss). With a cache hit, the requested read data is already located in cache and is simply retrieved from the cache and returned to the requesting client. With a cache miss, the requested read data is not found in cache. In order to service the read request when the data is not currently in cache, the requested read data is retrieved from the physical storage device, stored in cache, and then provided to the requesting client, such as a host. In connection with write requests, a data storage system in an embodiment in accordance with techniques herein may implement write-back caching. When a write request is received, the data to be written may be stored in cache and marked as write pending. At a later point in time, the write pending data may be destaged whereby such data is written out from the cache to the physical storage device. An acknowledgement may be sent to the requesting client, such as a host, once the write pending data is written to cache. It should be noted that the cache may already contain an entry corresponding to the write operation location. For example, the write operation may indicate to write data to a particular LUN and LBA (logical block address) on that LUN, such as LUN X, LBA Y. At the time the write operation is received, there may already be an existing write pending entry in the cache for LUN X, LBA Y. In this case, the received write operation data may be stored in the existing cache entry with the new write data. Alternatively, if there is no existing write pending entry in the cache for LUN A, LBA Y, a cache entry may be allocated for storing the write operation data.

Generally, as set forth in more detail in following paragraphs, an embodiment in accordance with techniques herein may use main or global memory, such as for the data cache, where the main or global memory used for the data cache may be comprised of flash memory-based storage devices of one or more different types of flash drives, or one or more write endurance classifications. Different types of flash drives, such as SLC and MLC, have different write endurance. As known in the art, flash-based media experiences wear out based on the number of writes performed. Within a lifetime or usage period, the amount of writes that each type of flash, such as MLC or SLC, may be expected to successfully sustain varies. For example, SLC stores one bit of information or data per cell and may be the simplest of all flash types. Due to having only one bit per cell, it may therefore have the longest lasting of the flash types in an embodiment in accordance with techniques herein. In contrast, for example, with MLC, multiple bits of information are stored per cell and wear rate during write operations is greater than with SLC. Thus, during a usage or lifetime period, an SLC device is expected to be able to have a larger number of allowable writes than an MLC device. In this manner, the SLC device may be characterized as an example of a type of flash having a higher write endurance than another type of flash media such as the MLC device.

A flash memory-based storage device may have an expected lifetime (e.g., as measured in an amount of actual elapsed time such as a number of years, months, and/or days) based on a number of guaranteed write cycles, or program cycles, and a rate or frequency at which the writes are performed. To guarantee approximately the same lifetime of use (in terms of wall clock time) for different types of flash-based physical storage devices, such as SLC and MLC, a different number of allowable writes per day may be specified for each type of flash-based physical storage device (e.g., SLC, MLC, TLC) based on the write endurance variation of each type. In other words, different types of flash technology also have different wear levels.

As known in the art, flash drives may have write endurance expressed in full drive writes per day based an expected lifetime of usage. For example, a 200 GB drive having N full drive writes per day (to last for a specified lifetime such as 5 years) may write 200*N GB per day. Thus, the writes/day may be characterized as an average amount of allowable writes/day in order to have the physical device operate for the specified lifetime.

It should be noted that although techniques described in following paragraphs may be illustrated with respect to flash memory-based storage devices, more generally, techniques herein may be applied in connection with any storage media and technology that has an expected lifetime or usage that is a function of the number of writes or program erasures made with respect to that physical device. For example, techniques herein may also be used in connection with phase-change memory (PCM) devices. PCM is also known in the art as PCME, PRAM, PCRAM, Ovonic Unified Memory, Chalcogenide RAM and C-RAM and is a type of nonvolatile random-access memory. Generally, such a storage device, such as a flash memory-based storage device, that has an expected lifetime or usage that is a function of the number of writes or program erasures made with respect to that physical device may be characterized as having a write capacity denoting a total number of writes expected that the physical device can sustain during its operable lifetime. A remaining write capacity may denote an amount, portion or percentage of the such expected number of total writes remaining that have not yet been consumed whereby the remaining write capacity may decrease each time a write is made to the physical storage device. The remaining write capacity of a physical storage device (also referred to herein as % lifetime remaining) may be expressed, for example, as a percentage with respect to the write capacity for the physical storage device.

In a cache, the life-cycle of data may be described as a process of a) promotion; b) update (e.g., write a new or updated value for a cached data item) or re-reference (e.g., read from cache); and c) eviction (e.g., where the data item stored in cache is removed). The promotion of data into the cache may include first deciding where to place this data (i.e., on what device and at what address), making the proper entries into an index (e.g., identifying what data item is stored at what cache location to be able to subsequently locate a particular data item), and then writing the data to be cached into the specified location.

Described in following paragraphs are techniques that may be used in connection with a cache comprising some number of modules or storage devices of limited-write media such as flash memory-based storage devices whereby such techniques provide for placing newly promoted data into cache onto a device having the least wear. A cached data item, once initially stored in cache, may also be subsequently updated (re-written) at different rates during their lifetime in the cache. Thus, techniques herein also provide for taking this additional wear or usage into account when selecting where (e.g., what flash device) to initially place newly promoted data items into cache. Techniques herein provide for storing a newly promoted data item in a selected flash device of the cache based on the latest information available regarding remaining write capacity or remaining lifetime of the multiple flash devices of the cache. Such techniques taking into account the additional write capacity or allowable writes that may be introduced by adding or replacing flash drives comprising the cache. As described in more detail in following paragraphs, an embodiment in accordance with techniques herein may use consistent hashing to select a particular flash drive (e.g., providing the cache storage) upon which to store newly cached data. Such techniques may leverage a consistent hash to implement device weights which, over time, may be dynamically adjusted based on remaining write capacity or remaining lifetime of the device based on remaining writes for an expected lifetime of that device. Using such techniques herein provides for selecting a particular one of the flash drives determined to have the most remaining write capacity with respect to all the flash drives to extend the amount of wall clock time the flash drives may be actually be used in a system.

Flash memory-based storage devices and, more generally, other types of physical storage devices used in connection with techniques herein, may support and operate in accordance with the SMART (Self-Monitoring, Analysis and Reporting Technology) standard. SMART is an industry standard interface such as used in connection with computer hard disk drives (HDDs) and flash memory-based drives to detect and report information on various indicators of reliability. One piece of information reported by SMART flash memory-based drives is the percentage of lifetime remaining (% lifetime remaining) of a drive. For example, a flash drive may report its % lifetime remaining based on the number of physical erase cycles completed on the drive as a percentage of the maximum physical erase cycles the drive is designed to endure. Generally, the physical drive manufacturer may certify the drive to a certain class of program erase cycles.

A data storage system in accordance with techniques herein may include rotating disk drives, flash memory-based storage devices, and DRAM. Although an embodiment may have a data cache that includes only the flash memory-based storage devices, an embodiment may also have a multi-level data cache that includes DRAM and also the flash memory-based storage devices.

When data is moved, placed or otherwise relocated to the flash memory-based storage devices such as to store a data item in cache comprising such storage devices, processing is performed to determine select one of the flash memory-based storage devices upon which to store the data item. In an embodiment in accordance with techniques herein, an adapted version consistent hashing may be used as described in following paragraphs.

Consistent hashing is a technique that was developed to deal with the problem of balancing workloads in a large, globally distributed network. It allows for the addition or removal of slots in a hash table without requiring a full remapping of the keys that are indexed by this table. Additionally balancing the workload within the hash can be controlled by varying the replicas of each destination. The discussion below describes methods for utilizing this technique to address a problem that is unique to certain types of storage media, such as flash memory-based storage devices and other media types such as described herein that more generally having a lifetime that is a function of the number of writes or program erasures made with respect to that physical device. For these media types, it is critical that the number of new writes not exceed a threshold value else the device must be replaced, or in the case of failure, the entire contents lost.

A hash function may generally be described as function that maps input data of arbitrary size to data of fixed size. The resultant values returned by the hash function may also be referred to as hash values. The resultant hash values produced by the hash function may form a fixed or predetermined set of values also referred to herein as a key space. The hash function may map an input, such as an input string, numeric value input, and the like, to a hash value or key in the defined key space.

Consistent hashing uses a hash function that produces a uniform random number across a key space K. Generally, the hash function used with consistent hashing produces as an output a hash value characterized as a uniform distribution across the key space. Over time, the generated hash value is uniform. In other words, the hash function used for consistent hashing should generally map the expected inputs as evenly as possible over its output range or possible hash values whereby every hash value in the output range should be generated with roughly the same probability. Techniques herein using consistent hashing may generally use any suitable hash function meeting the foregoing criteria of producing a uniform random number across the key space K. For example, a cryptographic hash function may be used such as MD-5 or SHA1.

Processing described herein uses consistent hashing to produce one or more hash values (HVs) for each of multiple nodes whereby each of the nodes may represent a different one of the flash memory-based storage devices of the cache. The set of generated HVs for the particular destination nodes may serve as markers in partitioning the key space among the nodes by defining a set of HVs or keys of the key space that are mapped to each destination node/server based on a rule.

Figure 3:
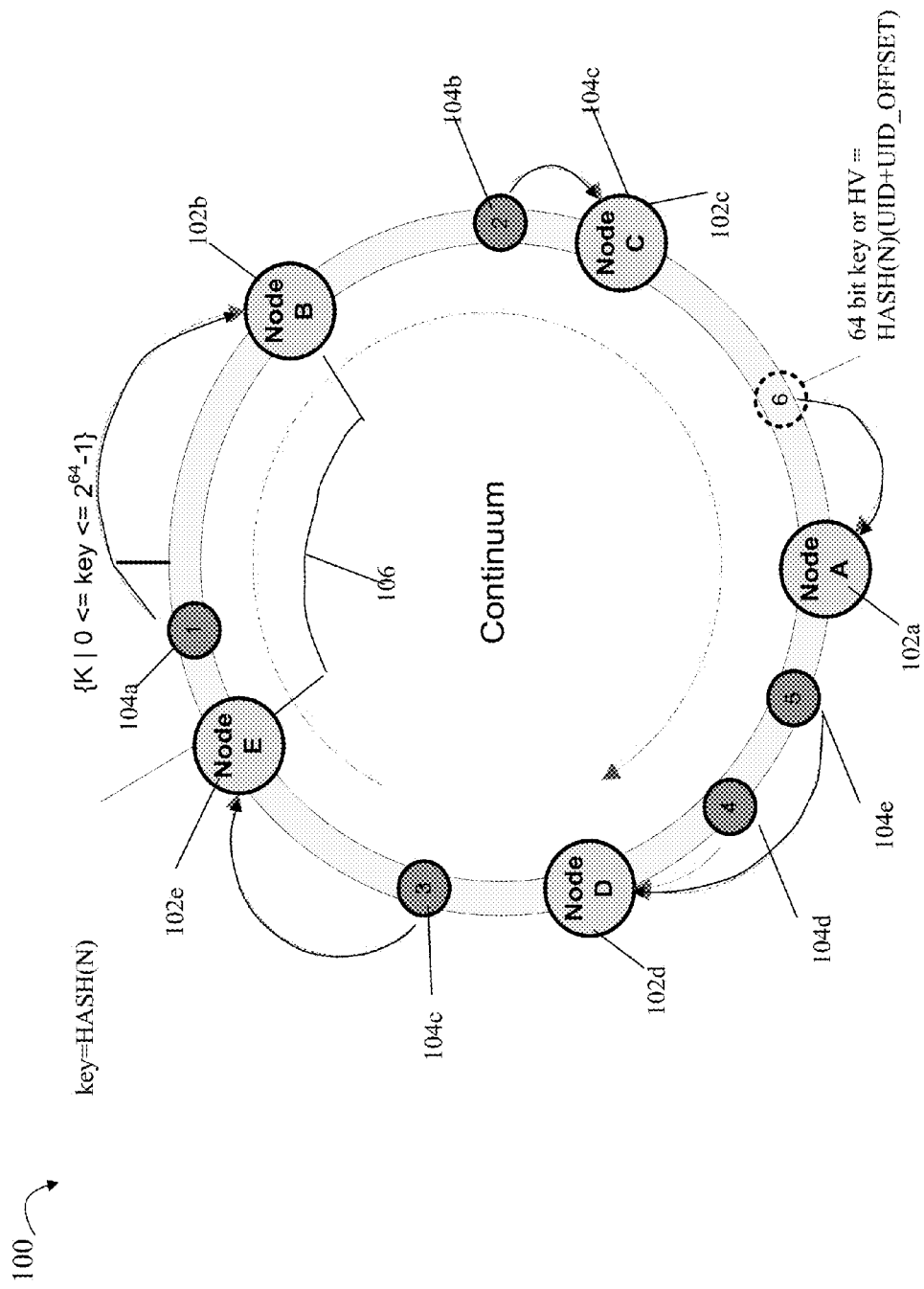
FIGS. 3 and 4 are examples illustrating use of techniques herein.

For example, with reference to FIG. 3, shown is an illustration 100 of consistent hashing that may be used in an embodiment in accordance with techniques herein. The example 100 illustrates the range of hash values (HVs), or the entire set of values in the key space K, that may be generated by the hash function as a circular key space denoting a continuum. In this example, assume a key space K includes values in a 64-bit key space for values in the inclusive range of 0 to $2^{64}-1$. In this example, there are 5 destination nodes A, B, C, D and E.

A hash function HASH(N) may be used which takes an input that is a string, generally any suitable input, and may output a HV in the key space K, where N may represent the input. In accordance with techniques herein, each destination node may represent a different one of the flash PDs (physical devices or physical storage devices) upon which cached data may be stored.

Each node may be identified by a unique string identifier, or more generally, any suitable unique identifier for a node. For example, nodes A, B, C, D, and E may be identified, respectively, by "NODE A", "NODE B", "NODE C", "NODE D", and "NODE E". The destination node identifiers may be hashed into the key space K. In other words, for each of the 5 destination node identifiers, an HV or key value may be generated by the hash function using a hash input value identifying the destination node. For example, a first HV, HV 1, may be generated for node A using a hash function input "NODE A", a second HV, HV 2, may be generated for node B using a hash function input "NODE B", a third HV, HV3, may be generated for node C using a hash function input "NODE C", a fourth HV, HV4, may be generated for node D using a hash function input "NODE D", and a fifth HV, HV5, may be generated for node E using a hash function input "NODE E". In the example 100, each of the foregoing 5 HVs generated for each of the destination nodes are denoted by 102a-102e where 102a represents the HV1 generated for node A, 102b represents HV2 generated for node B, 102c represents the HV3 generated for node C, 102d represents HV4 generated for node D, and 102e represents HV5 generated for node E. Let each of the HVs or keys generated for each of the destination nodes using the unique string identifiers for the nodes also be referred to herein as a marker for that destination node whereby 102a-e may, respectively, represent markers for the 5 destination nodes A-E (e.g., 102a is a marker for node A, 102b is a marker for node B, and the like). For a uniform distribution, the key space between each pair of markers must be equal. Hashing a single instance of each of the destination node's unique string identifier to produce a single marker for each node will not produce an even key space between each pair of markers. To solve this, replicas for each node are hashed into the key space to statistically produce an even key space. The amount of key space dedicated to each node is proportional to the number of replicas created for each node. For example if there were only two nodes "NODE A" and "NODE B" and "NODE A" had twice as many replicas as "NODE B" then any entry hashed into the keyspace would have twice the probability of hashing to "NODE A". A replica for a destination node may be defined as an additional hash function input value also uniquely identifying or representing the destination node where the replica for a node is used to generate additional markers for the node. For example, "NODEAn", wherein "n" is an integer equal to or greater than zero (0) may be used to denote replicas for NODEA. In a similar manner, replicas may be uniquely used to identify each of the different nodes.

For example, an embodiment may hash 1000 replicas of each node (e.g., HASH(node_name+0-999)) and generate 1000 markers for each node along the continuum. For the purposes of simplicity of illustration, the example 100 shows only single markers 102a-e for each destination node.

Let P be a data value identifying a data item to be placed in the cache. The data value P may be provided as an input to the hash function (e.g., HASH (P)) that generates a hash value of PH used to select a particular one of the destination nodes representing a flash PD upon which the data value P is stored. The hash value PH is a value in the key space K and PH may be located on the continuum in the example 100. For example, let PH be represented by 104a. Using a first rule, the next marker located sequentially along the continuum in a clockwise direction is then located and the particular destination node associated with that next marker is selected as the destination of the data item. In effect, the use of the rule and the sets of HVs or markers provides for partitioning the key space and mapping a data item's HV to one of the HV markers associated with a particular node. With respect to 104a, the next marker in a clockwise direction is 102b associated with node B so that the data item identified by P may be stored on the particular flash PD represented by node B.

It should be noted that an embodiment may similarly use a second rule in which the counter clockwise direction is used rather than the clockwise direction. To further illustrate, the hash value PH may be located on the continuum in the example 100 as above. For example, let PH be represented by 104a. The next marker along the continuum in a counter clockwise direction is then located and the particular destination node associated with that next marker is selected as the destination of the data item. With respect to 104a, the next marker in a counter clockwise direction is 102e associated with node E so that the data item identified by P may be stored on the particular flash PD represented by node E.

Similarly, 104b-e may each represent different HVs generated using the hash function for different data values of data items to be placed in cache. Applying the first rule noted above to locate the first marker in a clock-wise direction, the data item corresponding to 104b may be stored on the flash PD represented by 102c for node C, the data item corresponding to 104c may be stored on the flash PD represented by 102e for node E, and the data items corresponding to 104d, 104e may be stored on the flash PD represented by 102d for node D.

Thus, techniques herein may use consistent hashing to generate a set of keys or HVs that are markers for each destination node corresponding to a different one of the flash devices. Using a rule such as the first or second rule above, the key space K may be partitioned among the different destination nodes whereby approximately the same number of keys of the key space are mapped to each of the different nodes. As just described, an embodiment may use the same number of replicas and hence the same number of markers may be generated for each node corresponding to a different flash device that may be selected for storing cached data. Using the same number of replicas for each node such as 1000 is based on the assumption that each of the flash devices represented by a node has the same device weight. Generally, a device weight may be determined for each device in accordance with one or more differing factors between the different flash devices comprising the cache. Such factors may include the storage capacity and a remaining write capacity, such as % lifetime remaining, for the particular device. For example, an embodiment may use the same number of replicas and hence generate the same number of corresponding markers for each of 5 devices represented by nodes A-E in FIG. 3 when each of the 5 devices has the same storage capacity and the same remaining write capacity, and thus each of the 5 devices has the same relative weighting. However, if a first of the devices has more wear relative to any of the 5 others of the cache, the number of replicas for that first device is accordingly decreased for that first device to decrease that first device's portion of the key space and thereby reduce the chance of selecting the first device. Similarly, if a first device has less wear relative to any of the other PDs of the cache, the number of replicas for that first device is accordingly increased for that first device to increase that first device's portion of the key space and thereby increase the chance of selecting the first device relative to the other devices. Additionally, even though all the devices may have a same remaining lifetime or remaining write capacity, a first device may have a greater storage capacity relative to any of the other devices of the cache whereby the number of replicas for that first device is accordingly increased for that first device to increase that first device's portion of the key space and thereby increase the chance of selecting the first device. Similarly, even though all devices may have a same remaining lifetime or remaining write capacity, the first device may have a lesser storage capacity relative to any of the others of the cache whereby the number of replicas for that first device is accordingly decreased for that first device to decrease that first device's portion of the key space and thereby decrease the chance of selecting the first device. Another factor may be the particular flash type or technology, such as whether the devices under consideration are TLC, MC, SLC, and the like whereby such devices of different flash types may have, for example, a different number of allowable writes/day. If the devices are each of the same flash-type or technology, the weight of the different devices may not vary or be affected by this factor. However, if the cache comprises devices of different flash-type or technologies, the device weights for the different devices may also take this into account. For example, a first device may be SLC having a write endurance that is twice that of a second device that is an MLC device. If both the first and second devices have the same storage capacity and remaining write capacity, the weight for the first device may be twice that of the second device wherein twice as many replicas are used for the first device as the second device. Yet another factor may be device speed such as, for example, I/O throughput capability or I/O rate (e.g., I/Os second) or data throughput capability or data transfer rate (e.g., bytes/second). If, for example, device A is twice as fast as device B (e.g., device A can process twice as many I/Os in a time period as device B, device A's weight may be increased whereby more data is directed to device A than device B. Assuming that device A and device B otherwise do not have any other factors besides device speed that affect their relative weights (e.g., both device A and B are of the same technology, same storage capacity, and have the same remaining write capacity) then device A's weight may be twice that of device B's.

Thus generally, such differences in the number of replicas assigned to each device may be represented using the relative weights assigned to each device. The device weights may be periodically adjusted to take into account any writes consumed in the time that has elapsed since the weights were last adjusted.

As a first example, for simplicity, assume there are 3 flash physical devices (PDs) and each PD has the same storage capacity. A scaling may be defined that specifies a number of replicas to be used for different amounts of % lifetime remaining in a PD. For example, consider the set of 3 flash PDs—A, B, C—used for cache each of the same flash type and each having a 1 TB (terabyte) storage capacity and use the following to determine a number of replicas to use for each PD based on % lifetime remaining for each PD:

| % Lifetime remaining | # Replicas |
| --- | --- |
| 100 | 1000 |
| 90 | 900 |
| ⋮ | ⋮ |
| 10 | 100 |
| ⋮ | ⋮ |
| 1 | 10 |

At a first point in time, all 3 PDs are new and have 100% lifetime remaining Thus, at the first point in time, the relative weights for each PD may be the same and 1000 replicas may be used for each of the 3 PDs A, B and C.

Generally, the % lifetime remaining for a PD may be obtained using a defined and supported standard interface, such as the SMART interface described elsewhere herein. Such information regarding % lifetime remaining may be obtained for each PD at each point in time at which there is a re-evaluation of the device weights.

At a second point in time, processing is performed to re-evaluate the weight, and hence the number of replicas, for each of the PDs A, B and C, based on the wear or number of writes that has occurred to each of the PDs since the first point in time. Assume, for example, that C has been much more heavily written to than A and B (e.g., more overwrites to cached data items on C) whereby at the second point in time the following are the % Lifetime remaining for the PDs and the associated number of replicas used for each PD:

| PD | % Lifetime remaining | # Replicas |
| --- | --- | --- |
| A | 90 | 900 |
| B | 90 | 900 |
| C | 10 | 100 |

Based on the foregoing, the % lifetime remaining may denote the relative weights of each of the PDs relative to one another. It should be noted that the relative device weights may be further normalized (e.g., to be within a particular range).

Based on the foregoing at the second point in time, an embodiment may remove 100 of A's replicas and associated markers, may remove 100 of B's replicas and associated markers, and may remove 900 of C's replicas and associated markers to statistically reflect the frequency with which each PD is chosen when promoting new data items for caching. With reference back to FIG. 3, removing a marker or HV associated with a particular PD may include removing one of the markers from the continuum for that PD.

When the number of replicas and hence HVs for each PD is adjusted to remove KVs associated with a particular PD, in accordance with techniques herein the key space K is also accordingly repartitioned or redistributed among the PDs. Any new data item placed in cache subsequent to the repartitioning will be placed on a selected PD based on the repartitioned key space using the revised set of HVs (which include the HV removals). Existing data items having associated HVs in the affected key space portions that have been repartitioned may also now be relocated to new corresponding PDs based on the updated repartitioning of the key space. For example, with reference to FIG. 3, if marker 102*b* is removed for B, the affected repartitioned key space is denoted by the arc portion 106 of the continuum between 102*a* and 102*b*. In an embodiment using the first rule for mapping described elsewhere herein, before the repartitioning, all data items having corresponding HVs denoted by 106 are stored on device B and must be relocated to a new PD based on the revised mapping with the removal of 102*b*. After 102*b* is removed and there is a revised or repartitioned key space, any HV in 106 is now relocated to device C denoted by 102*c*. More generally, in a similar manner, adding or removing a marker for a PD causes repartitioning of a portion of the key space and any data items currently stored on PDs of the cache prior to the repartitioning are now relocated to new PDs based on the revised partitioned key space. As described elsewhere herein, such relocation may be performed by those currently stored data items having corresponding HVs in the affected (e.g., revised or repartitioned) portion of the key space.

Generally, the time period or interval at which the re-evaluation to adjust device weights and number of replicas may be any suitable time period such as, for example, every hour, a specified number of hours, daily, and the like.

Now consider a second example. Assume there are 3 flash PDs—X, Y and Z—where all PDs are the same flash-type or technology, X has twice the storage capacity of Y and Z, and that all 3 PDs are new (e.g., 100% lifetime remaining) Let Y and Z have storage capacity N denoting N units of storage, N being greater than 0, and let X have storage capacity 2N. In this example, the above-mentioned scaling may be used defined that specifies a number of replicas to be used for different amounts of % lifetime remaining in a PD for a particular amount of storage capacity N whereby the number of replicas for each PD may be adjusted based on each PDs relative storage capacity as well as % lifetime remaining Thus, 1000 replicas may be used for a PD having storage capacity N with % lifetime remaining and the foregoing number of replicas may be scaled or adjusted based on each PDs relative storage capacity and % lifetime remaining.

At a first point in time, all 3 PDs are new and have 100% lifetime remaining Thus, at the first point in time, Y and Z may have the same relative weight. However, X may have twice the relative weight of each of Y and Z due to the storage capacity difference. The following represents the relative storage capacity, % lifetime remaining and number of replicas used for each PD:

| PD | % Lifetime remaining | Storage capacity | # Replicas |
|----|---------------------|------------------|-----------|
| X  | 100                 | 2N               | 2000      |
| Y  | 100                 | N                | 1000      |
| Z  | 100                 | N                | 1000      |

In the foregoing table, the storage capacity difference in weighting may represent the relative device weights.

At a second point in time, processing is performed to re-evaluate the weight, and hence the number of replicas, for each of the PDs X, Y and Z, based on the wear or number of writes that has occurred to each of the PDs since the first point in time. Assume, for example, that Z has been much more heavily written to than X and Y whereby at the second point in time the following are the % Lifetime remaining for the PDs and the associated number of replicas used for each PD

| PD | % Lifetime remaining | Storage capacity | # Replicas |
|----|---------------------|------------------|-----------|
| X  | 90                  | 2N               | 1800      |
| Y  | 90                  | N                | 900       |
| Z  | 10                  | N                | 100       |

Based on the foregoing, an embodiment may remove 100 of A's replicas and associated markers, may remove 100 of B's replicas and associated markers, and may remove 900 of C's replicas and associated markers to statistically reflect the frequency with which each PD is chosen when promoting new data items for caching.

The above first and second examples describe adjusting the number of replicas by removing or reducing the total number of replicas collectively from the first point in time. Such a technique may also be referred to herein as the removal technique.

The removal technique may be used to predict the endpoint at which a PD may be expected to reach its end of life which may be associated with a 0% lifetime remaining and no replicas. For example, it may be observed that over a time period of 6 months, a PD has gone from a % lifetime remaining of 100% to 50% and the number of replicas for the PD has been reduced from 1000 (for 100% lifetime remaining) to 500 (for 50% lifetime remaining) Based on the foregoing rate of removal of replicas, it may be estimated that the PD has about another 6 months before the number of replicas for the PD goes to zero thereby indicating the PD's end of life or usage. Prior to the PD reaching this endpoint associated with zero replicas, the customer or user of the data storage system may be warned and advised to replace the PD with another new PD. The user may be advised, for example, to replace the PD with a new PD within a certain time period such as when it is predicted to have a threshold number of replicas assigned to the PD.

Generally, an embodiment may select a relatively large number of replicas based on the size of the key space K. The number of replicas may vary relative to the size of the key space K and storage capacity of the PDs. The number of replicas used in an embodiment may be selected through experimentation.

The foregoing first and second examples illustrate the removal technique. As a first alternative to the removal technique described above in connection with the first and second examples, the same total number of replicas may always be used but the particular portion or amount of the total number assigned to each PD may be adjusted or repartitioned at each point in time based on the one or more factors such as the % lifetime remaining, storage capacity of each PD, and any in write endurance due to difference in flash type or technology.

To further illustrate, consider a third example where there are 3 PDs and each PD has the same storage capacity and is the same flash type or technology. The above-noted scaling may be used that specifies 1000 replicas to be used for each PD with a 1 TB capacity and 100% lifetime remaining Let there be 3 flash PDs—A, B, C—used for cache each having a 1 TB (terabyte) storage capacity At a first point in time, all 3 PDs are new and have 100% lifetime remaining (and thus all 3 PDs have the same weight). Thus, at the first point in time, 1000 replicas may be used for each of the 3 PDs A, B and C. The total number of replicas used at each point in time may be 3000 whereby the total number of 3000 replicas may be repartitioned among the 3 PDs at various points in time based on % lifetime remaining of PD.

At a second point in time, processing is performed to re-evaluate the weight, and hence the number of replicas, for each of the PDs A, B and C, based on the wear or number of writes that has occurred to each of the PDs since the first point in time. Assume, for example, that C has been much more heavily written to than A and B whereby at the second point in time the following are the % Lifetime remaining for the PDs and the associated number of replicas used for each PD whereby the total number of 3000 replicas is repartitioned among the PDs based on their relative storage capacities (which is the same per PD in this simple example) and their relative % lifetime remaining based on the amount of write capacity remaining (e.g., the amount of write wear that has occurred since the first point in time).

| PD | % Lifetime remaining | # Replicas |
|----|---------------------|-----------|
| A  | 90                  | 1200      |
| B  | 90                  | 1200      |
| C  | 45                  | 600       |

As yet another alternative, rather than use the same number of replicas each time period, an embodiment may generally select a minimum number of total replicas that may be used. An embodiment may continue to reduce or remove replicas as described above in connection with the first and second examples. However, the total number of replicas across all PDs must always be larger than the minimum number of total replicas. If not, processing may then switch to use the first alternative technique as illustrated by the third example whereby each subsequent time period includes repartitioning the minimum number of total replicas based on the storage capacity and % lifetime remaining of the PDs. In this manner, an embodiment may ensure at least a minimum number of replicas are always used to obtain a desired level of granularity of distribution across the key space K.

Consider a fourth example illustrating use of techniques herein to add new flash PDs to increase the capacity or size of the cache. For example, assume use of a number of replicas and the removal technique as in examples 1 and 2 above. At a first point in time, let there be 3 PDs—A, B, and C—each being a 1 TB drive of the same flash type and each with a 50% lifetime remaining Let 1000 replicas be used for a PD having a 1 TB drive and 100% lifetime remaining which may be scaled based on the storage capacity and % lifetime remaining as in the first and second examples above. At the first point in time, the following represents the number of replicas for each PD

| PD | % Lifetime remaining | Storage capacity | # Replicas |
|----|---------------------|------------------|-----------|
| A  | 50                  | 1 TB             | 500       |
| B  | 50                  | 1 TB             | 500       |
| C  | 50                  | 1 TB             | 500       |

Also, at this first point in time, two new PDs—X and Y—may be added to increase the cache capacity whereby X and Y are new PDs each with 100% lifetime remaining and each also having a 2 TB capacity of the same flash type as PDs A, B and C. Based on the foregoing, A, B, and C each have the same relative weights. However, to account for differences in storage capacity and % lifetime remaining, X and Y each have a relative weight that is 4 times that of A, B or C. For example, if a weight of 1 unit is associated with each of A, B and C, X and Y each have twice the % lifetime remaining and twice the storage capacity of A, B and C. Using techniques herein, 2000 replicas may be used for each new PD X and Y to generate additional markers for X and Y. The key space is accordingly remapped or readjusted based on these additional generated markers for X and Y. In the foregoing example based on the relative proportion of replicas, X and Y are proportionally mapped to 4 times the number of keys of the key space K than any of A, B, and C. For example, X has 2000 replicas and A, B and C each have 500 replicas. Thus, X has 4 times the number of replicas as each of A, B and C and therefore X has approximately 4 times the number of keys and therefore is statistically 4 times more likely to be selected for storing newly cached data items than any of A, B or C. The foregoing reduces the likelihood that A, B and C will be selected and written to and therefore allows A, B and C to remain in use in the system longer.

Thus, based on the foregoing, techniques herein may be used to adjust or repartition the key space if additional PDs are added to the cache or removed from the cache. In such a case where a PD is added, a number of keys or HVs for each newly added device may be generated to represent the newly added PD and its associated portion of the key space. Thus, when there is a modification to the set of flash PDs whereby a new PD is added, the key space may be accordingly repartitioned among the set of flash PDs in existence after the modification. Additionally, existing cached items may be remapped to their new flash PD based on the revised key space mapping of key values to PD. It should be noted that only cached data associated with the revised portion of the mapping needs to be relocated (e.g. only currently cached data items having a corresponding HV in the affected HVs now remapped to a different PD).

Continuing with the fourth example, assume at a second point in time that the new PDs X and Y are removed from the cache. For simplification, assume that A, B and C have % lifetimes as in the above table at the first point in time. Responsive to removing X and Y, all HV markers for X and Y are simply removed thereby causing a redistribution or repartitioning of the key space among only the PDs A, B and C. In such a case, cached data currently stored on X and Y may be remapped or relocated to one of the PDs A, B and C based on the revised repartitioning of the key space. Additionally, any newly cached data that is cached subsequent to the removal of X and Y is also placed going forward using the revised mapping based on the revised repartitioning of the key space.

What will now be described is a further more detailed and formal example illustrating techniques herein. Generally, a set D of PDs to be used for caching may be identified wherein each such PD may be represented by a node. D may refer to the set of PDs and a particular $i^{th}$ individual PD of the set D may be denoted by d(i). A hashing function may be defined that takes as input a sub-name used to identify caching devices or some value to identify data items in the cache. As an output, the hashing function produces a random key k that is uniformly distributed across range K (key space). In one embodiment, a particular data item being placed in the cache may be identified by its address, such as based on its LUN (or logical device identifier) and LBA. The foregoing address of a data item may be used as the input to the hash function to determine a corresponding HV for that data item where the HV may be mapped to one of the markers associated with a particular PD (as described elsewhere herein).

Consistent with discussion elsewhere herein, a weighting scheme may be defined for each of the devices d(i) such that:

Find the device weight w(i) by dividing the total write capacity for each device by some quanta X (e.g., one Terabyte)

For each device d(i) create a number of replica keys r(n) in key space K, where n (the number or quantity of replica keys) is w(i) times some constant (e.g. 100). Each replica key r(n) corresponds to a marker for d(i) as described elsewhere herein and is an HV generated using the hash function for a unique sub-name representing the device d(i). However, each of the markers or replica keys represents d(i).

The weight assigned to each PD may be represented as the number of replicas for that PD present in the consistent hash. PDs that have more replicas have the highest weights are statistically chosen more often for promoting new cache pages than other PDs having lesser weights.

The weight of each cache PD is reevaluated on some interval, I. At each interval, weights are adjusted for each cache device, reducing their weights by the amount of writes consumed in the previous interval.

Figure 4:
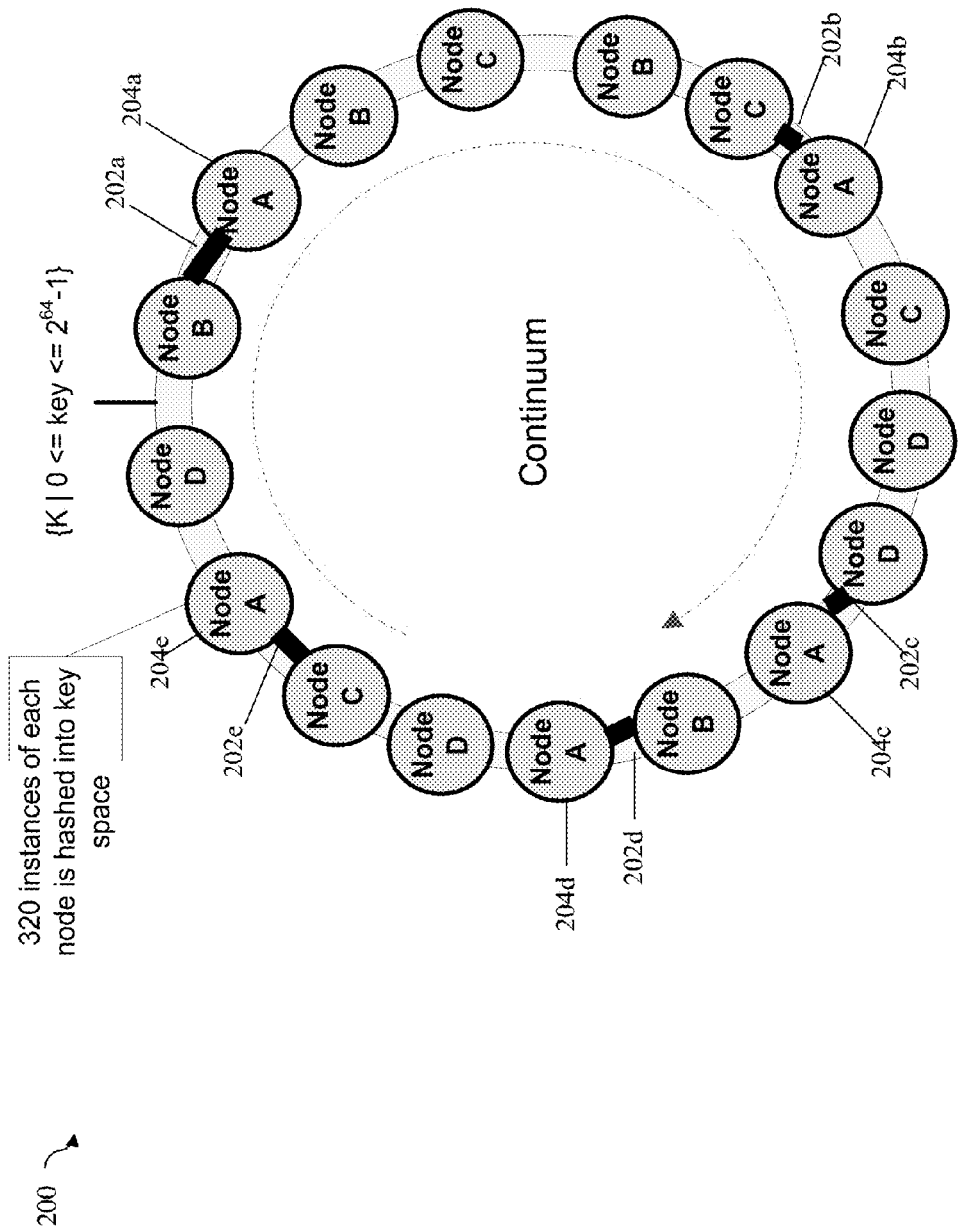

Referring to FIG. 4, shown is another representation of the continuum of HVs of the key space as in FIG. 3 with additional markers thereon that will now be used in connection with a further example.

For this example, assume initially there is a set of four PDs—A, B, C, and D—each with a weight of 32 (all new devices). Each PD may then be represented by a node with 320 replicas hashed into the key space K to generated 320 HV markers or replica keys. The example 200 illustrates some markers for the different PDs as previously described in connection with FIG. 3. In the example 200, not all markers or replica keys are shown for each PD for simplicity of illustration. Since each PD has the same number of replicas, each PD consumes approximately the same amount of key space statistically. Said another way, the sum of the arc space along the key space continuum for each PD is approximately the same length and therefore each PD will receive approximately the same proportion of promotions. For example, 204a-e may denote HV markers or replica keys for node A representing PD A. Applying the first rule as described elsewhere herein, each of 202a-e may identify arc portions of the key space mapped to PD A. In a similar manner, arc portions of the continuum may be determined for each of the other PDs based on markers for each such PD. The sum of the HVs represented by arc portions for each of the PDs may be approximately the same.

As I/Os are received and different data items are promoted into cache, the addresses of such data items are hashed to produce HVs or keys which are randomly distributed across key space K. The HVs or keys for the data items to be cached are compared to the set of markers or replica keys which represent the cache PDs (nodes). The target PD selected for the promotion (e.g., upon which to store the data item) is the next sequential marker or replica key along the continuum after the HV or key for the data item.

At a later point in time as more data items are written to the cache and as currently cached items are overwritten, the amount of remaining write capacity may vary between PDs. At some interval, the amount of replicas present in the consistent hash is adjusted based on the weight calculated for each device. The granularity of adjustment can be made arbitrarily large or small through the use of a scaling multiplier that increases the baseline number of replicas within the range. Continuing with this example, after the cache has been operating for some time, the remaining write capacity in all four PDs has been decreased by half. This means that each PD is now only represented by 160 markers or replica keys, but because they are still balanced, the rate of assignment of new data items is stored to each device remains even. If, however, PD A starts to become heavily utilized (because cached data items stored thereon were being updated or overwritten frequently), PD A's remaining write capacity would be reduced at a higher rate. Therefore PD A's weight would be proportionally lowered relative to the weights of the other PDs thereby leading to a proportional reduction in new pages being added as PD A's replicas are progressively removed. Conversely, if the user decided to increase the capacity of the cache by adding one or more new PDs, then each of these PDs would be represented by a higher number of replicas, leading to a proportional shift in workload towards these newly added PDs. If, for some reason it was determined that a particular device should no longer be utilized, either temporarily or permanently, it is a simple matter to halt any new promotions by removing all replicas for that PD.

Besides caching, techniques herein have more general and broader applicability for use in connection with any processing that selects one of multiple flash memory-based PDs upon which to store data. The foregoing description refers to a first use where the data item being stored may be promoted into cache. As another application, techniques herein may be used in connection with thin or virtually provisioned devices to select a PD from which a storage allocation is made to store data. A thin device is a type of logical device where units of storage are progressively allocated on an as-needed basis. Typically, the base units of storage are provisioned from multiple sets of PDs organized as RAID groups, where these groups are partitioned into small portions sometimes referred to as slices. There is a mapping provided to relate the logical address in a thin device to the particular slice of provisioned storage. In a system using thin provisioning, the thin devices may appear to a host coupled to a data storage array as one or more logical volumes (logical devices) containing contiguous blocks of data storage. A thin device may be virtually provisioned in terms of its allocated physical storage where physical storage for a thin device (presented to a host as having a particular capacity) is allocated as needed rather than allocate physical storage for the entire thin device capacity upon creation of the thin device. As such, a thin device presented to the host as having a capacity with a corresponding LBA range may have portions of the LBA range for which storage is not allocated. In some embodiments, storage associated with a particular subrange of the logical address space of a thin device (where the subrange may be the size of a slice or chunk allocation unit) may be initially allocated in response to the first time there is write to the logical address subrange. The technique described herein may be used to select a source PD for a new thin device slice in much the same manner as described herein for the cache. For example, assuming storage for the new slice is allocated from flash PDs, techniques herein may be used to select a particular PD for storing the write data. This technique also easily supports the addition and removal of RAID groups for maintenance and expansion purposes. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, and U.S. Pat. No. 7,949,637, Issued May 24, 2011, Storage Management for Fine Grained Tiered Storage with Thin Provisioning, to Burke, both of which are incorporated by reference herein.

As another application, techniques herein may be used in connection with automated storage tiering and data movement between such tiers such as may be performed by a data storage optimizer to improve data storage system performance. For example, the Fully Automated Storage Tiering (FAST) product produced by EMC Corporation of Hopkinton, Mass., provides such automated movement of data between different storage tiers to optimize use of the different storage tiers including the ability to easily create and apply tiering policies (e.g., allocation policies, data movement policies including promotion and demotion thresholds, and the like) to transparently automate the control, placement, and movement of data within a storage system based on business needs. A data storage optimizer, multi-tiered storage and automated tiering is described, for example, in U.S. Pat. No. 8,583,838, Techniques for statistics collection in connection with data storage performance, Nov. 12, 2013, which is incorporated by reference herein. In such a multi-tiered storage environment, each of the different storage tiers may include different PDs having different performance characteristics. For example, a multi-tiered storage system may include a first tier of HDDs and a second tier of flash memory-based PDs. In such an environment where data that is promoted or placed into the second tier, techniques herein may be used to select a particular one PD of the second tier upon which to store the data. It should be noted an embodiment may generally include in the same tier or in different storage tiers different types of flash PDs having different write capacities. As an example, different flash media may be used having different write capacities such as may be typically provided in 30-write/day, 10-write/day, and 3-write/day categories. In such an embodiment, the techniques described herein may be used to handle the differences between multiple limited-media tiers having different write capacities where the differences in write capacities may be represented by (as in the examples described above) through varying device weights. For example, assuming 3 PDs where a first PD has a write endurance of 30-writes/day, a second PD has a write endurance of 10-write/day, and third PD has a write endurance of 3-write/day categories, 10×, 3.3×, and 1× may, respectively, represent the ratio of the device weights utilized in an embodiment in accordance with techniques herein.

As yet another application, techniques herein to provide a "best-fit" profile to other metrics such as average response time performance. In current practice, if there are two tiers with response time performance X and Y, with X<Y, the auto-tiering function may attempt to place the most active data on the X media, and the less active data on Y. However, if the capacity of X is small, and the performance relationship is X<<Y (hat is, much less), then the effect is to have some part of the system with a very fast response, and some of the system with a very slow response. Consider two applications running on such a system, called A and B—where the capacity used by A is slightly larger than X, and A is more active than B. With the foregoing methodology, where the X tier will be allocated strictly on a most-active basis, A will consume all of the faster storage, and B will get none. The average response time seen by B will by Y, and the average for A will be proportional to the storage used, or 1/(nX+mY). It may not be desirable for A to entirely consume the faster physical storage resource. Techniques described herein may be used to provide a capability where the response time characteristic can be adjusted for both applications A and B by creating weightings that proportionally allocate new storage from both media types X and Y, e.g., A=pX+(1−q)Y and B=(1−p)X+qY to achieve response time targets that are intermediate between the underlying storage characteristics. To further illustrate, an application A may experience (for example) a 300% improvement in performance, while B stays close to its nominal performance when autotiering to a flash tier is introduced. However, what may be desired is to improve A by (at least) 100%, and B by (at least) 50%. The weighted hashing scheme described herein may be used to drive the system into this intended state by balancing the amount of data that is promoted to the flash tier from either A or B. In this case, there are two separate hash spaces, one for evaluating A, and the other for B. The underlying storage tiers may be divided up into data extents called slices that represent some unit of capacity in that tier. These slices act as the "nodes" in our previous examples (Xi and Yi), and are replicated and distributed into the hash spaces, with differing percentages based upon some pre-specified goal (I used response time in the below). In one implementation, the policy could start at a 50/50 mix, where p=0.5 and q=0.5. In this condition the weightings of X and Y are the same for both spaces. If the tiering policy determines from the workload that a particular element of data used by A should be moved from Y to X, it will hash the data address and place it into the ring. If it hits on a slice in Y, then the data is not moved, and if it hits on a slice in X, it will be forwarded to the tier manager to be moved to X. Similarly, data in B will evaluated on its continuum of the key space. The weightings for X and Y can be adjusted separately for A and B (if the average response time for A is higher than its goal, then it will increase the X weighting on its continuum of the key space).

What will now be described are flowcharts summarizing processing that may be performed in an embodiment in accordance with techniques herein.

Figure 5:
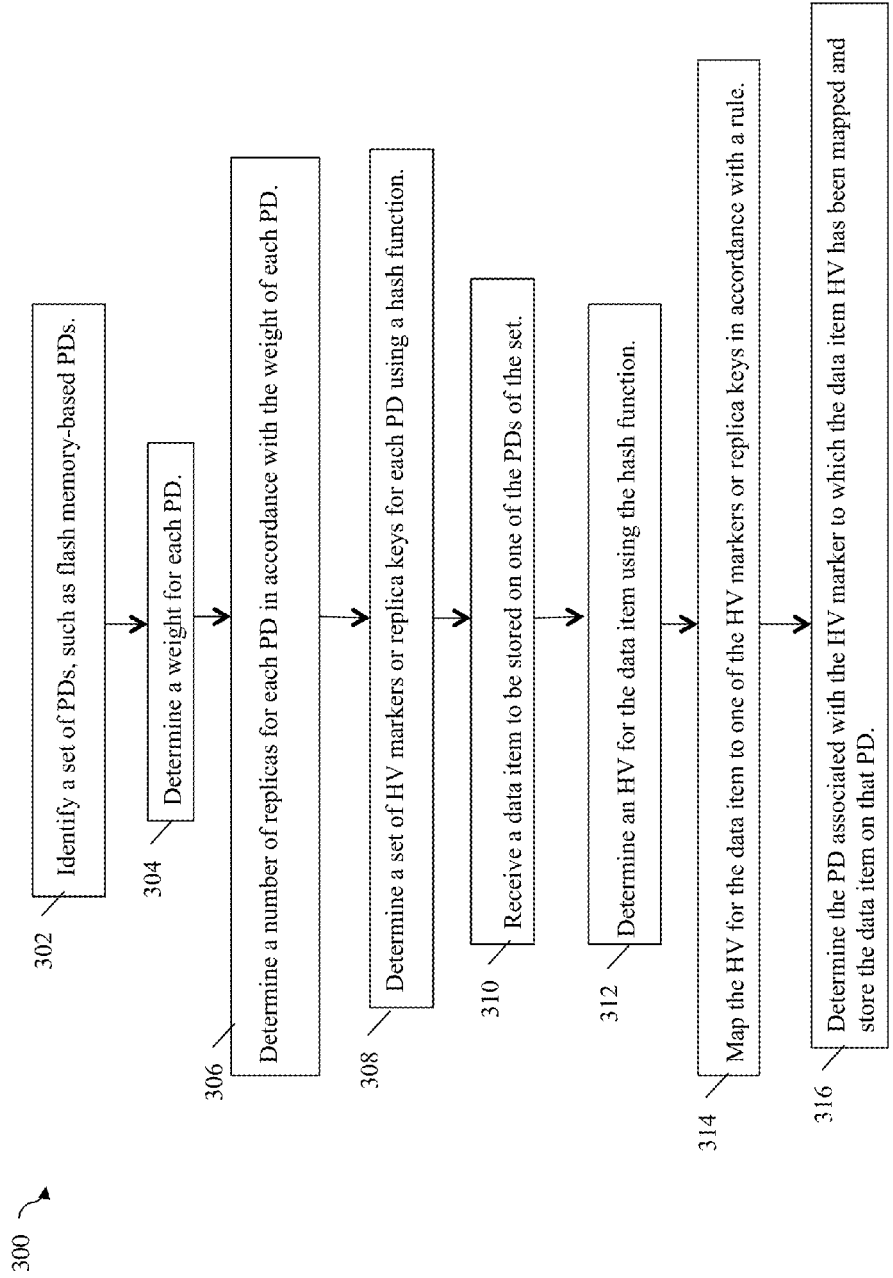
FIGS. 5-8 are flowcharts of processing steps that may be performed in an embodiment in accordance with techniques herein.

Referring to FIG. 5, shown is a first flowchart 300 of processing steps that may be performed in an embodiment in accordance with techniques herein. At step 302, a set of PDs, such as flash memory-based PDs are identified to be used in connection with techniques described herein. At step 304, a weight is determined for each PD. At step 306, a number of replicas is determined for each PD in accordance with the weight for each PD. At step 308, a set of HV markers or replica keys is determined for each PD using the hash function and replicas for the PD. At step 310, a data may be received that is to be stored on one of the PDs of the set. In step 312, an HV for the data item may be determined using the hash function. At step 314, the HV for the data item may be mapped to one of the HV markers or replica keys in accordance with a rule. The rule may be any of the first rule and the second rule as described elsewhere herein. At step 316, the PD associated with the HV marker to which the data item HV has been mapped is determined and the data item is stored on that PD.

Figure 6:
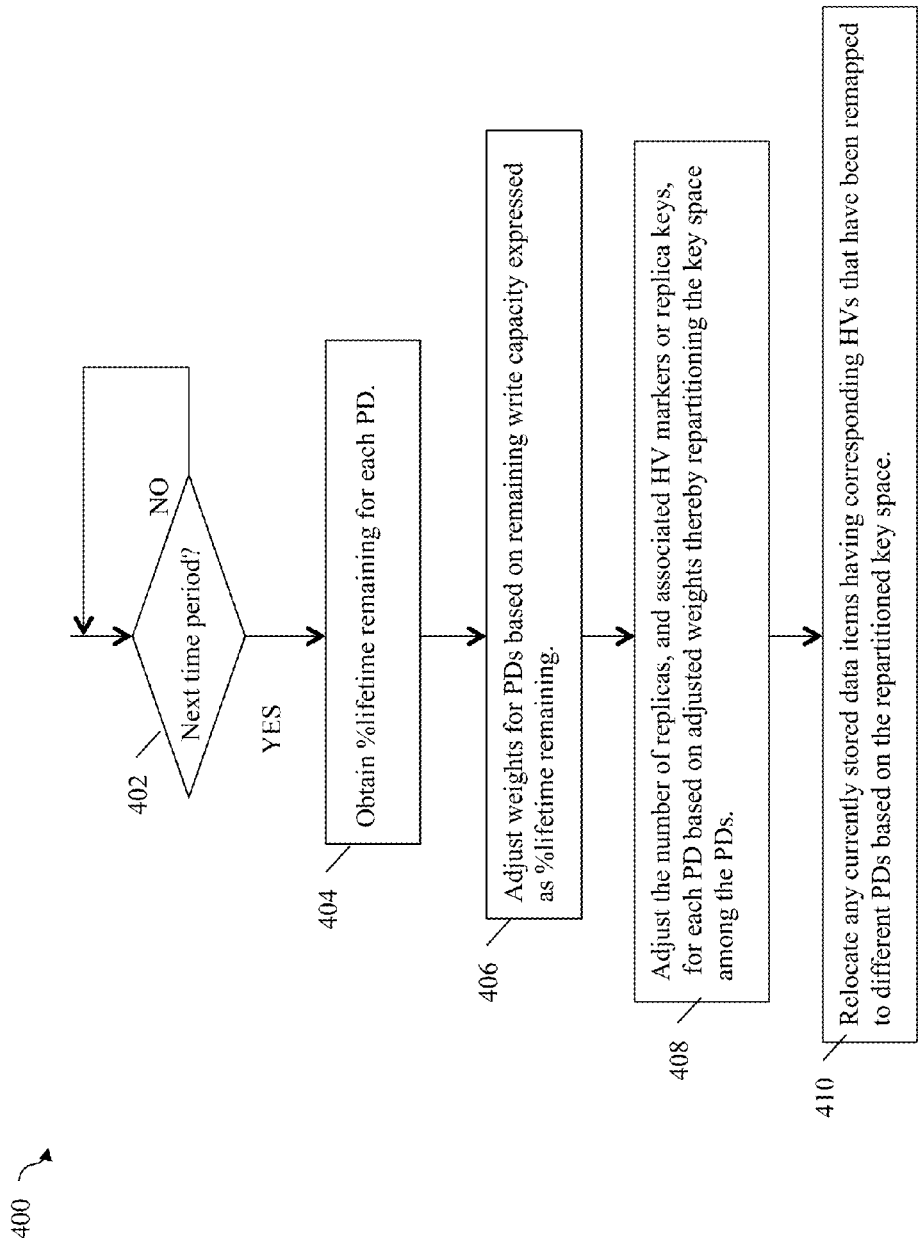

Referring to FIG. 6, shown is a second flowchart of processing steps that may be performed in an embodiment in accordance with techniques herein. The flowchart 400 may be performed to periodically adjust the device weights based on write consumed or performed in the since last adjusted. In step 402, a determination is made as to whether the next time period has arrived to perform weight adjustments. Control remains at step 402 until step 402 evaluates to yes whereby control then proceeds to step 404. At step 404, the % lifetime remaining may be obtained for each PD in the set. At step 406, the weights for the PDs may be adjusted based on the remaining write capacity of the PDs where the remaining write capacity is expressed as % lifetime remaining. At step 408, processing is performed to adjust the number of replicas and associated HV markers or replica keys for each PD based on the adjusted weights thereby repartitioning the key space among the PDs. At step 410, processing may be performed to relocate any currently stored data items having corresponding HVs that have been remapped to different PDs based on the repartitioned key space. In connection with step 410 processing, it should also be noted that an embodiment alternatively choose not to relocate currently stored data items having corresponding HVs that have been remapped to different PDs based on the repartitioned key space. Rather, an embodiment may choose to let the relocation happen implicitly in connection with the next reference to a data item. For example, assume data item 1 has a corresponding HV that is in the affected or remapped key space that is repartitioned as a result of step 408 processing. Prior to the repartitioning of the key space, data item 1 may have a corresponding HV that is mapped to PD1 and after the repartitioning, the corresponding HV for data item 1 may map to PD2. Rather than relocate data item 1 from PD1 to PD2, the cached data items (such as data item 1) having corresponding HVs in the affected or remapped key space may be initialized, marked as "dirty" containing invalid data, and the like. At a later point in time, data item 1 may again be promoted to cache whereby data item1 is again stored in cache but in accordance with the repartitioned key space.

Figure 7:
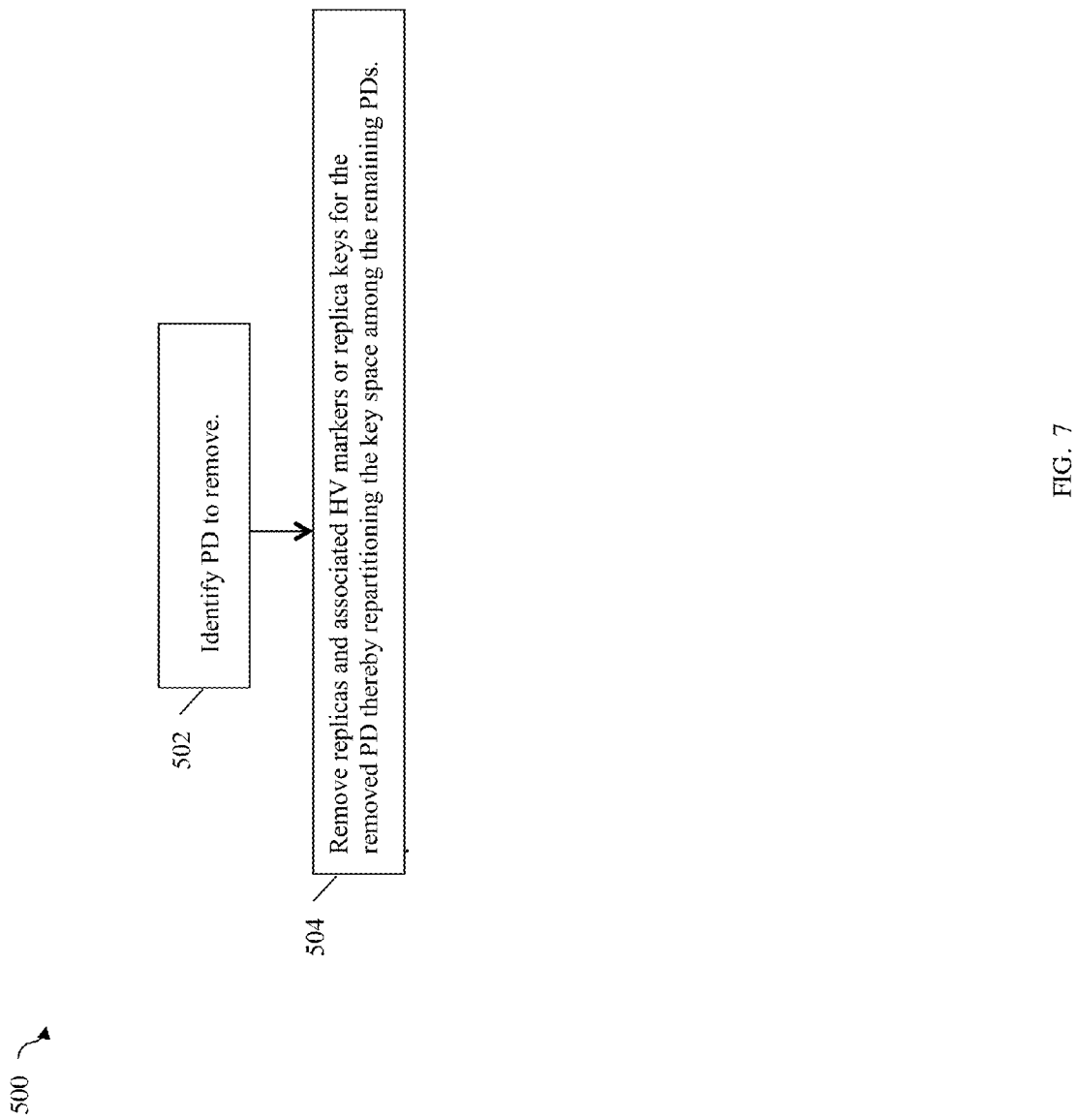

Referring to FIG. 7, shown is a third flowchart of processing steps that may be performed in an embodiment in accordance with techniques herein. The steps of flowchart 500 may be performed in connection with removing a PD from the set of PDs such as may be used for the data cache. At step 502, the PD to be removed is identified. At step 504, processing is performed to remove replicas and associated HV markers or replica keys for the removed PD thereby repartitioning the key space among the remaining PDs of the set. It should be noted that flowchart 500 generally describes processing performed using the removal technique. Alternatively, an embodiment may utilize a fixed number of replicas that is repartitioned in step 504 among the remaining PDs. Additionally, it should be noted that an embodiment performing the steps of 500 may not relocate data items stored on the removed PD. Rather, as described above in connection with step 410, such data items may be subsequently once again promoted into cache in connection with the next reference to the data items. As an alternative, an embodiment may perform the steps of flowchart 500 with an additional last step to optionally relocate data items from the removed PD to one of the remaining PDs based on the repartitioned key space after the PD is removed along with its associated HVs being redistributed to remaining PDs. In connection with this alternative embodiment, processing may include an additional step performed after step 504 to relocate any currently stored data items (of the removed PD) having corresponding HVs that have been remapped to different PDs based on the repartitioned key space. In connection with this last optional step, processing may include recording the continuum mapping HVs to PDs as it was prior to the repartitioning (in addition to having the current continuum mapping of the key space after repartitioning) so that the mapping prior to repartitioning may be used to retrieve currently stored data items on the removed PD.

Figure 8:
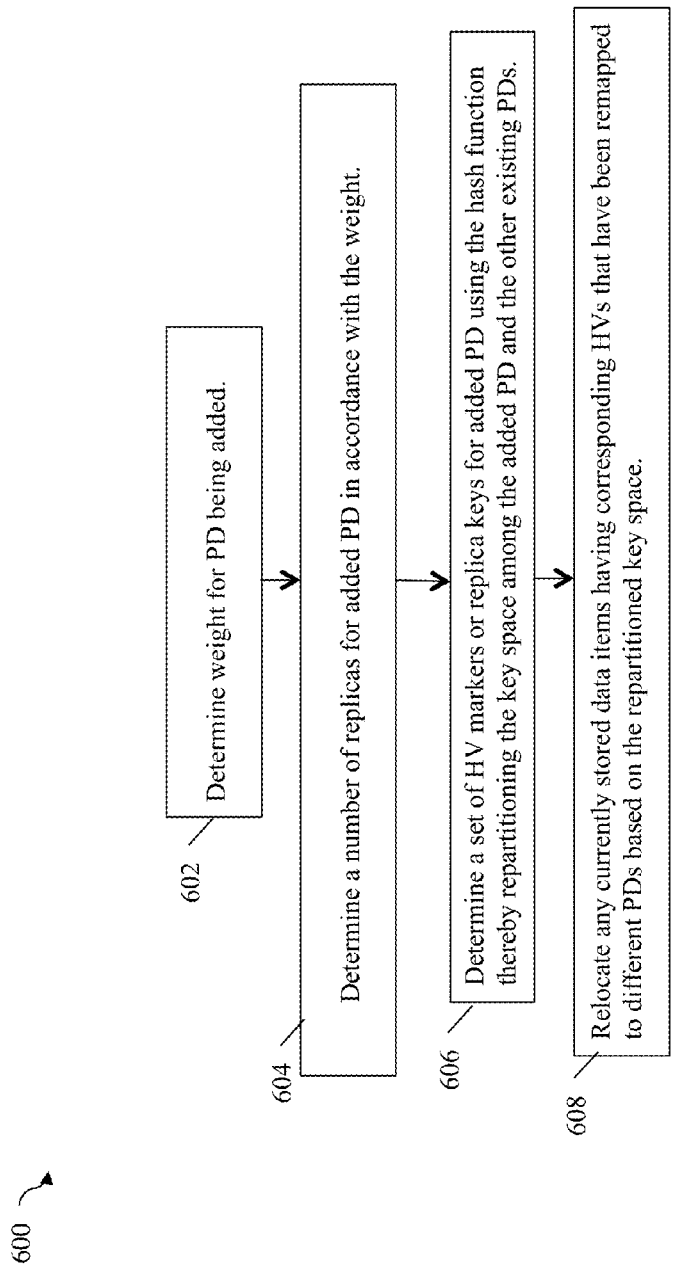

Referring to FIG. 8, shown is a fourth flowchart of processing steps that may be performed in an embodiment in accordance with techniques herein. The steps of flowchart 600 may be performed when adding a PD to the set of PDs such as may be used as the data cache. At step 602, a weight is determined for the PD being added. In step 604, a number of replicas is determined for the added PD in accordance with the weight for the added PD. At step 606, a set of HV markers or replica keys for added PD is determined using the hash function and thereby repartitioning the key space among the added PD and the other existing PDs. At step 608, processing is performed to relocate any currently stored data items having corresponding HVs that have been remapped to different PDs based on the repartitioned key space. It should be noted that flowchart 600 generally describes processing performed using the removal technique. Alternatively, an embodiment may utilize a fixed number of replicas that is repartitioned among both the newly added PD and the existing PDs.

In connection with embodiments described herein, it should be noted that when nodes of the continuum are adjusted thereby repartitioning the key space, an embodiment has another processing option. Assume a data item is in cache and the data item's HV maps to PD1 before repartitioning the key space and the data item's HV maps to a different PD2 with the repartitioned key space. Also, assume there is a request to read the data item. In this case, an embodiment may perform alternative processing rather than once again promote the data item freshly into cache based on the read. In this alternative processing, a read cache hit occurs where the data exists on PD1 whose mapped HVs or portion of key space (e.g., arc space on the continuum) has been reduced such as due to reduced remaining write capacity. In such a case, the data item may be safely read from PD1 (using the data item's HV as determined prior to repartitioning) even though a new repartitioned key space is in effect where the data item has an HV value that now maps to PD2.

An embodiment may implement the techniques herein using code executed by a processor. For example, an embodiment may implement the techniques herein using code which is executed by a processor of a system, such as the data storage system, management system, or more generally, any computer system. As will be appreciated by those skilled in the art, the code may be stored on the data storage system on a computer-readable storage medium (also referred to as a computer readable medium) having any one of a variety of different forms including volatile and nonvolatile, removable and non-removable media implemented in any method or technology for storage of information such as computer readable instructions, data structures, program modules or other data. Computer-readable storage media (or computer readable media) includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of selecting a physical storage device for storing data comprising:
 determining a plurality of device weights for a plurality of physical storage devices, wherein a different one of the plurality of device weights is determined for each of the plurality of physical storage devices in accordance with one or more factors including any of a storage capacity of said each physical storage device and an amount of remaining write capacity of said each physical storage device representing an amount of remaining writes for an expected lifetime of said each physical storage device;
 determining a replica set for each of said plurality of physical storage devices, said replica set for said each physical storage device including a number of replicas in accordance with the different one of the plurality of device weights for said each physical storage device;
 determining a plurality of hash value sets for said plurality of physical storage devices, wherein an associated one of the plurality of hash value sets is determined for each of said plurality of physical storage devices, said associated one of the plurality of hash values sets for said each physical storage device including hash values determined using a hash function and said replica set of said each physical storage device, wherein each of said hash values is generated as an output of the hash function when using a corresponding one of the replicas of the replica set for said each physical storage device as an input to the hash function;
 determining a first hash value for a first data item using the hash function;
 mapping the first hash value to a second hash value included in a first of the plurality of hash value sets associated with a corresponding one of the plurality of physical storage devices; and
 selecting the corresponding one of the plurality of physical storage devices to store the first data item.

2. The method of claim 1, further comprising:
 storing the first data item on the corresponding one of the plurality of physical storage devices.

3. The method of claim 1, wherein said hashing function generates a hash value included in a predetermined range of hash values, said predetermined range of hash values forming a continuum of hash values wherein a smallest hash value in the predetermined range subsequently follows a largest hash value in the predetermined range.

4. The method of claim 3, wherein said mapping is performed using any of a first rule that maps the first hash value to a nearest subsequent hash value in the continuum that is included in one of the plurality of hash value sets for one of the plurality of physical storage devices and a second rule that maps the first hash value to a nearest previous hash value in the continuum that is included in one of the plurality of hash value sets for one of the plurality of physical storage devices.

5. The method of claim 3, wherein the first plurality of physical storage devices includes at least three physical storage devices, wherein the plurality of hash values sets is determined at a first point in time and the predetermined range of hash values is partitioned at the first point in time among the plurality of physical storage devices in accordance with the plurality of hash value sets, and the method includes performing first processing at a second point in time subsequent to the first point in time, said first processing including:

removing, at the second point in time, a first of the plurality of physical storage devices;

responsive to removing the first physical storage device, removing one of the plurality of hash value sets for the first physical storage device;

responsive to removing the one hash value set for the first physical storage device, repartitioning the predetermined range of hash values among remaining ones of the plurality of physical storage devices other than said first physical storage device in accordance with remaining ones of the plurality of hash value sets other than said one hash value set for the first physical storage device.

6. The method of claim 1, wherein a first of the plurality of physical storage devices has a first of the plurality of device weights and a second of the plurality of physical storage devices has a second of the plurality of device weights, said first weight being larger than the second weight whereby the first physical storage device is statistically selected by said mapping for storing a data item more frequently than the second physical storage device.

7. The method of claim 1, further comprising:
periodically adjusting said plurality of weights based on remaining write capacities of said plurality of physical storage devices at an end of a time period.

8. The method of claim 1, wherein the plurality of physical storage devices includes a first number of physical storage devices at a first point in time and wherein, at a second point in time subsequent to the first point in time, an additional physical storage device is added to a system including the first number of physical storage devices, and the method includes:
determining an additional weight for the additional physical storage device in accordance with a storage capacity and an amount of remaining write capacity of said additional physical storage device representing an amount of remaining writes for an expected lifetime of said additional physical storage device;
determining an additional replica set for said additional physical storage device, said additional replica set including a number of replicas in accordance with the additional weight for said additional physical storage device; and
determining an additional hash value set of hash values using the hash function and said additional replica set, wherein each of said hash values in the additional hash set is generated as an output of the hash function when using a corresponding one of the replicas of the additional replica set for said additional physical storage device as an input to the hash function.

9. The method of claim 8, wherein first processing is performed subsequent to determining the additional hash value set and subsequent to adding the additional physical storage device to the system, said first processing including:
determining a third hash value for a second data item using the hash function;
mapping the third hash value to a fourth hash value included in a second corresponding hash value set for a second corresponding one of the plurality of physical storage devices, wherein said second corresponding hash value set is either the additional hash value set of the additional physical storage device or one of the plurality of hash value sets associated with one of the first number of physical devices of the plurality of physical storage devices; and
selecting the second corresponding one of the plurality of physical storage devices to store the first data item.

10. The method of claim 9, further comprising:
storing the second data on the second corresponding one of the plurality of physical storage devices.

11. The method of claim 1, wherein a data cache includes the plurality of physical devices and wherein the method is performed to select the corresponding one of the plurality of physical storage devices for caching the first data item.

12. The method of claim 1, wherein, at a first point in time, a write operation is received to write the first data item to a first logical address of a virtually provisioned device and no storage is mapped to the first logical address at the first point in time, and wherein the method is performed responsive to receiving the write operation that writes the first data item to the first logical address, said method being performed to allocate storage from said corresponding one of the plurality of physical storage devices to store the first data item.

13. The method of claim 1, wherein the plurality of physical storage devices are included in a storage tier of a multi-tiered data storage system and the method is performed responsive to a decision to move the first data to the storage tier.

14. The method of claim 1, wherein said plurality of physical storage devices includes any of one or more flash memory-based storage devices and one or more phase change memory devices.

15. The method of claim 1, wherein each of said plurality of physical storage devices has an expected lifetime as a function of a number of writes that may be performed to said each physical storage device.

16. A data storage system comprising:
one or more processors;
a plurality of physical storage devices;
a memory comprising code stored therein that, when executed, performs a method comprising:
determining a plurality of device weights for the plurality of physical storage devices, wherein a different one of the plurality of device weights is determined for each of the plurality of physical storage devices in accordance with one or more factors including any of a storage capacity of said each physical storage device and an amount of remaining write capacity of said each physical storage device representing an amount of remaining writes for an expected lifetime of said each physical storage device;
determining a replica set for each of said plurality of physical storage devices, said replica set for said each physical storage device including a number of replicas in accordance with the different one of the plurality of device weights for said each physical storage device;
determining a plurality of hash value sets for said plurality of physical storage devices, wherein an associated one of the plurality of hash value sets is determined for each of said plurality of physical storage devices, said associated one of the plurality of hash values sets for said each physical storage device including hash values determined using a hash function and said replica set of said each physical storage device, wherein each of said hash values is generated as an output of the hash function when using a corresponding one of the replicas of the replica set for said each physical storage device as an input to the hash function;
determining a first hash value for a first data item using the hash function;
mapping the first hash value to a second hash value included in a first of the plurality of hash value sets associated with a corresponding one of the plurality of physical storage devices; and selecting the corresponding one of the plurality of physical storage devices to store the first data item.

17. A non-transitory computer readable medium comprising code stored thereon that, when executed by a processor, performs a method that selects a physical storage device for storing data, the method comprising:

determining a plurality of device weights for a plurality of physical storage devices, wherein a different one of the plurality of device weights is determined for each of the plurality of physical storage devices in accordance with one or more factors including any of a storage capacity of said each physical storage device and an amount of remaining write capacity of said each physical storage device representing an amount of remaining writes for an expected lifetime of said each physical storage device;

determining a replica set for each of said plurality of physical storage devices, said replica set for said each physical storage device including a number of replicas in accordance with the different one of the plurality of device weights for said each physical storage device;

determining a plurality of hash value sets for said plurality of physical storage devices, wherein an associated one of the plurality of hash value sets is determined for each of said plurality of physical storage devices, said associated one of the plurality of hash values sets for said each physical storage device including hash values determined using a hash function and said replica set of said each physical storage device, wherein each of said hash values is generated as an output of the hash function when using a corresponding one of the replicas of the replica set for said each physical storage device as an input to the hash function;

determining a first hash value for a first data item using the hash function;

mapping the first hash value to a second hash value included in a first of the plurality of hash value sets associated with a corresponding one of the plurality of physical storage devices; and selecting the corresponding one of the plurality of physical storage devices to store the first data item.

18. The non-transitory computer readable medium of claim 17, wherein the one or more factors include any of a flash type or technology, I/O (input/output) throughput capability, and data throughput capability.

19. The non-transitory computer readable medium of claim 17, wherein said plurality of physical storage devices includes any of one or more flash memory-based storage devices and one or more phase change memory devices.

20. The non-transitory computer readable medium of claim 17, wherein a data cache includes the plurality of physical devices and wherein the method is performed to select the corresponding one of the plurality of physical storage devices for caching the first data item.

* * * * *